US008812514B2

(12) United States Patent
Beatty et al.

(10) Patent No.: US 8,812,514 B2

(45) Date of Patent: Aug. 19, 2014

(54) WEB-BASED COMPETITIONS USING DYNAMIC PREFERENCE BALLOTS

(75) Inventors: John Beatty, San Francisco, CA (US); Michael Belleville, Milpitas, CA (US)

(73) Assignee: Yahoo! Inc., Sunnyvale, CA (US)

(*) Notice: Subject to any disclaimer, the term of this patent is extended or adjusted under 35 U.S.C. 154(b) by 332 days.

(21) Appl. No.: 11/862,108

(22) Filed: Sep. 26, 2007

(65) Prior Publication Data

US 2009/0083252 A1 Mar. 26, 2009

(51) Int. Cl.
*G06F 17/30* (2006.01)

(52) U.S. Cl.
USPC ........................................ 707/748; 707/752

(58) Field of Classification Search
USPC ............. 707/1-10, 723, 748, 999.01, 999.02, 707/999.03, 999.04, 999.05, 999.06, 707/999.07, 999.08, 999.09, 999.1
See application file for complete search history.

(56) References Cited

U.S. PATENT DOCUMENTS

| | | | | |
|---|---|---|---|---|
| 6,112,194 | A | 8/2000 | Bigus | |
| 7,162,433 | B1 | 1/2007 | Foroutan | |
| 7,172,118 | B2 | 2/2007 | Urken | |
| 2002/0103695 | A1* | 8/2002 | Urken et al. | 705/12 |
| 2005/0039135 | A1* | 2/2005 | Othmer et al. | 715/774 |
| 2005/0210025 | A1* | 9/2005 | Dalton et al. | 707/5 |
| 2005/0256848 | A1* | 11/2005 | Alpert et al. | 707/3 |
| 2007/0185599 | A1 | 8/2007 | Robinson et al. | |

FOREIGN PATENT DOCUMENTS

KR 10-2005-0102051 A 10/2005

OTHER PUBLICATIONS

International Search Report mailed on Feb. 27, 2009, for PCT Application No. PCT/US2008/076902, filed on Sep. 18, 2008, seven pages.

Written Opinion mailed on Feb. 27, 2009, for PCT Application No. PCT/US2008/076902 filed on Sep. 18, 2008, five pages.

Kittenwar.com (Date Unknown). "Kitten War! May the Cutest Kitten Win!" located at <http://kittenwar.com> last visited on Feb. 1, 2006, 8 pages.

Puppywar.com (Date Unknown). "Puppywar," located at <http://puppywar.com> last visited on Feb. 1, 2006, 6 pages.

* cited by examiner

*Primary Examiner* — Syed Hasan

(74) *Attorney, Agent, or Firm* — James J. DeCarlo; Greenberg Traurig, LLP

(57) ABSTRACT

In one example, a method for ranking items such as contest entries is provided. An exemplary method includes displaying sequential subsets of entries from a plurality of entries for a first user to vote on, e.g., making a selection of their preference of one over the other. The method further includes generating a first preference ballot of displayed entries based on selections by the first user, and ranking the plurality of entries based upon the first preference ballot and at least a second preference ballot received from another user. The ranking may be determined based on the first and second preference ballot by a Condorcet algorithm. Additionally, display of the entries may be determined based on previous selections associated with the contest entries, e.g., based on the state of the contest and/or the history of particular contest entries.

21 Claims, 7 Drawing Sheets

WEB-BASED COMPETITIONS USING DYNAMIC PREFERENCE BALLOTS

BACKGROUND

1. Field

The present invention relates generally to web-based contests and ranking systems, and in one particular example, to ranking multiple contest entries in a web-based contest via preference ballots.

2. Related Art

Various web-based voting systems are known. For instance, approval voting is known and generally characterized by a user voting for entries the user likes. Generally, the entry with the greatest number of votes is deemed the winner by such systems. In practice, particularly where there are many entries and a direct ballot can be cast for someone, the contest turns into a pure popularity contest. Such a voting system often suffers from a "clone" problem, where similar candidates may "split" votes. For example, if there are three entries and two of them are similar (e.g., would appeal similarly to users), the two similar entries are at risk of splitting votes because they likely appeal to the same sets of people. Accordingly, the third entry, which might be ranked third by those users voting on the two similar entries may receive the most votes and win.

Other know voting systems include "star" voting or "range voting," which is generally characterized by allowing voters to ascribe a number to an entry (e.g., a rating between 1 and 5). There are several ways of tallying such votes, e.g., as averaging the number of star ratings for each entry; the entry with the highest mean rating winning. Star voting often suffers from issues of factoring in the number of votes for each entry, as it will typically vary widely between entries, thereby making it difficult to rank entries.

Additionally, several pair-wise voting system are known for matching-up two items for display to a user and receiving a user entered vote for one of the two items. The items may then be ranked based on winning percentages (e.g., the highest or lowest rates of winning in a match-up). One such exemplary known system includes the Kittenwar web site (kittenwar.com), where users may upload photos to be voted on by other users, vote on uploaded photos, and view the "winningest" and "losingest" kitten photos based on their winning percentage in pair-wise match-ups. For example, during a voting process, two pictures of kittens are displayed and voted on by a user selection, e.g., clicking on one of the pictures. After voting on the displayed photos, two new photos are displayed and voted on by the user, and so on.

Ranking entries based on winning percentage in such pair-wise voting systems, however, may suffer in instances where some entries have been involved in votes more frequently than others (and are thus more accurately tested against the pool of entries). Additionally, as contest entries increase in numbers it may become increasingly difficult for voters to view all of the entries.

SUMMARY

In one example, a method for ranking items such as contest entries is provided. An exemplary method includes displaying sequential subsets of entries from a plurality of entries for a first user to vote on, e.g., making a selection of their preference of one of the displayed entries. The method further includes generating a first preference ballot, which may include defeat data or a ranked list of the displayed entries based on selections by the first user, and ranking the plurality of entries based upon the first preference ballot and at least a second preference ballot received from another user. The entries may include or be associated with various objects such as images, audio and/or video files, web sites, products, services, or the like.

In one example, the ranking may be determined based on the first and second ranked lists by a Condorcet algorithm, e.g., a Ranked Pairs, Minimax, or Schulze algorithm. Ranking may include a top-to-bottom ranking of all entries, a portion of the entries, or only determining a winner. Additionally, display of the entries may be determined based on previous selections associated with the contest entries, e.g., based on the state of the contest and/or the history of particular contest entries.

In another example, a method includes receiving a first preference ballot associated with a first user and a second preference ballot associated with a second user, the first and second ballots each ranking at least two of a plurality of entries. The method further includes ranking at least a portion of the plurality of entries based on the first and second preference ballots (e.g., via Ranked Paris or the like).

In another example, a method includes causing the display of a subset of entries from a plurality of entries, where the subset of entries for display is based on previous selections associated with the entries. The method further includes, causing the storage of a selection by a user of one of the entries of the subset of entries displayed, and ranking the plurality of entries based upon user selections of the entries.

In another example, an apparatus is provided for carrying out the described exemplary methods. For example, a server device and/or client device may include logic for carrying out the exemplary methods for ranking and/or contest entries.

In another example, a computer readable medium having computer program instructions is provided, the computer program instructions for carrying out the exemplary methods for ranking and/or contest entries.

The various aspects and examples of the present inventions are better understood upon consideration of the detailed description below in conjunction with the accompanying drawings and claims.

DETAILED DESCRIPTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

According to one example described herein, a system is provided for selecting and ranking a plurality of contest entries. An illustrative voting system operates to present a user a sequence of contest entry subsets and records user selections. The system guides the voter through any number of entries to create a preference ballot including defeat data or a ranked list of entries, at least a portion of which were voted on by the user. The system may rank entries based on submitted ballots from multiple users; in one example, using an algorithm taking into account the preference voting and defeat data or ranked list of entries from multiple users (such that the ranking is not merely based on winning percentages). An exemplary ranking method includes a Condorcet method algorithm; however, it will be appreciate that other pair-wise voting ranking algorithms are possible such as a Ranked Pairs, Minimax, or Schulze method.

Further, the system may include a scheduler (or scheduler logic) operable to schedule display time for entries, e.g., controlling the voting distribution over entries to a predetermined shape based on provisional entry quality. Accordingly, the scheduler may generally present a user highly ranked entries, which may increase user interaction as they are more likely to see “good” entries. Further, entries late to a contest may be scheduled more frequently to ensure sufficient voting relative to older entries, similar voting exposure, and the like.

It will be appreciated that although the ranking system is described herein for ranking entries in a contest, the exemplary systems and methods may be used to rank items for various purposes. For example, the exemplary ranking system may be used to rank user preferences for products, services, opinions, and so on.

Figure 1:
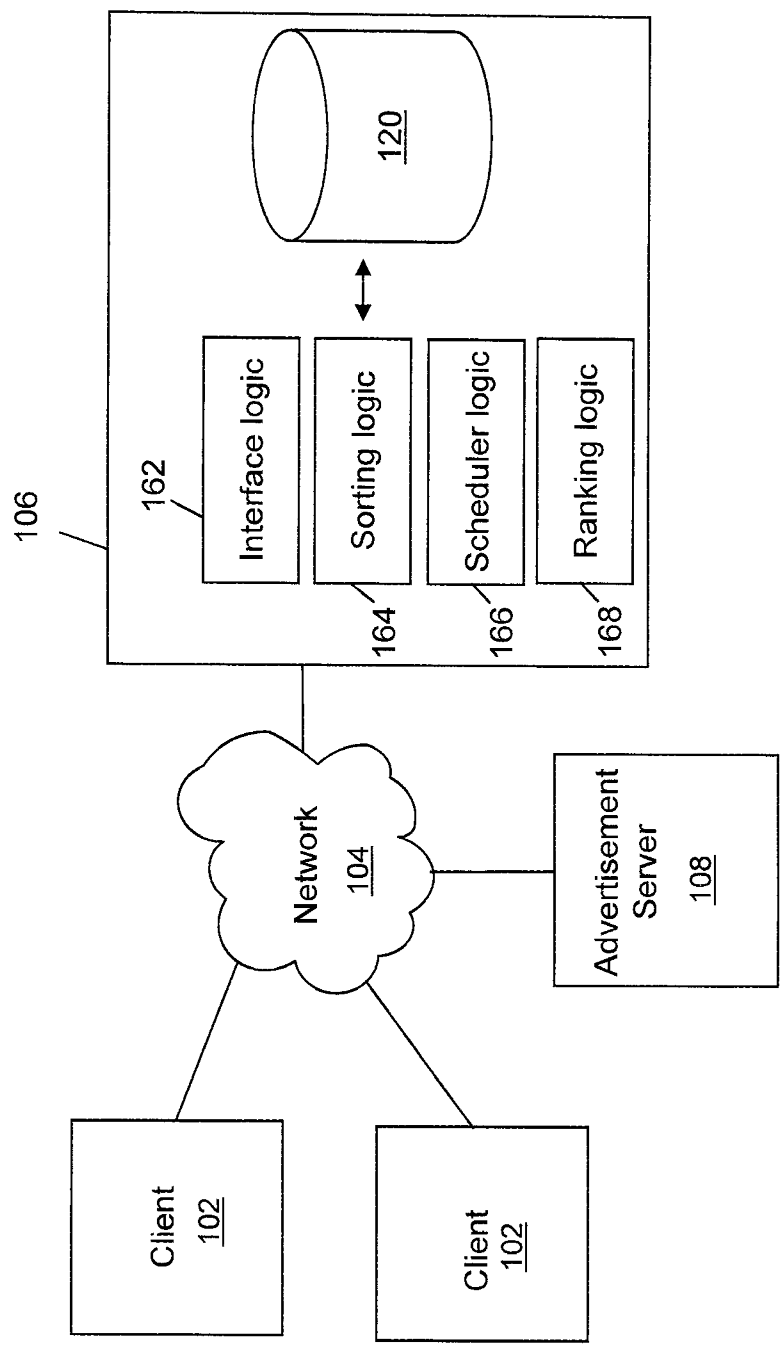
FIG. 1 illustrates an exemplary environment in which certain aspects and examples of the systems and methods described may be carried out.

FIG. 1 illustrates a block diagram of an exemplary environment in which certain aspects of the system may operate. Generally, a plurality of clients 102 may access a server 106. The server 106 and clients 102 of the present invention may include any one of various types of computer devices, having, e.g., a processing unit, a memory (including a permanent storage device), and a communication interface, as well as other conventional computer components (e.g., input device, such as a keyboard and mouse, output device, such as display). For example, client computer 102 may include a desktop computer, laptop computer, mobile device such as a mobile phone, web-enabled phone, smart phone, and the like.

Clients 102 and server 106 may communicate, e.g., via suitable communication interfaces via a network 104, such as the Internet. Clients 102 and server 106 may communicate, in part or in whole, via wireless or hardwired communications, such as Ethernet, IEEE 802.11b wireless, or the like. Additionally, communication between clients 102 and server 106 may include various servers such as a mail server, mobile server, and the like.

Server 106 may include or access interface logic 162, sorting logic 164, scheduler logic 166, ranking logic 168, and database 120. In one example, interface logic 162 communicates data to clients 102 for causing the display of an interface and/or entries as described herein. Further, interface logic 162 may receive data from users 102, including uploaded contest entries, ballots, votes, ranked lists of entries, comments, and the like.

In one example, sorting logic 164 is used to present a predefined set of contest entries, e.g., stored with data base 120, to a client 102. Sorting logic 164 may further rank the set of contest entries according to user selections, and generate a preference ballot including defeat data or a ranked list of the contest entries voted on by a particular user. As described herein, the ballot may then be compared with other user ballots to determine a contest winner and ranking. Various examples and implementation of sorting logic 164 are described in greater detail below.

In one example, scheduler logic 166 is for scheduling the display of contest entries with a client device 102 after the initial set of displayed contest entries have been sorted by sorting logic 164. In one example, scheduler logic 166 operates to display highly ranked contest entries to users more frequently than lower ranked contest entries. For instance, scheduler logic 166 may sort or assign entries into buckets or sub-sets according to their current ranking and schedule an entry for display based on the current bucket or sub-set of the entry. For example, a bucket corresponding to highly ranked entries may be scheduled to display more frequently than lower ranked entries. Further, entries with relatively few votes associated therewith (e.g., have been involved in vary few match-ups) may be scheduled for display more frequently. Various examples and implementation of scheduler logic 166 are described in greater detail below.

Ranking logic 168 operates to tally the votes based on user selections, and in particular, based on received ballots. In one example, as described in greater detail below, ranking logic 168 operates according to a Condorcet or Ranked Pairs method to determine a winner and rank at least a portion of the entries.

Server 106 is further programmed to format data, accessed from local or remote databases or other sources of data, for presentation to users of clients 102, preferably in the format discussed in detail herein. The server 106 may utilize various Web data interface techniques such as Common Gateway Interface (CGI) protocol and associated applications (or “scripts”), Java® “servlets”, i.e., Java applications running on the Web server, or the like to present information and receive input from clients 102. The server 106, although described herein in the singular, may actually comprise plural computers, devices, backends, and the like, communicating (wired and/or wireless) and cooperating to perform the functions described herein.

FIG. 1 further illustrates an advertisement server 108, which may communicate through network 104 with one or more clients 102 and/or to server 106. Advertisement server 108 may operate to associate advertisements with user-generated search requests and/or responses for transmission to a client 102. For example, an advertisement may be associated with a response to client 102 based on the contest or contest categories accessed (which may include viewing, voting, submitting an entry, or the like). For example, an advertisement may be based on a contest category, displayed or selected contest entries, votes or voting patterns, submitted contest entries, user profile information, or combinations thereof. In one example, advertisement server 108 communicates with server 106 and transmits advertisement data thereto, for example, in response to input from client 102. Server 106 may transmit the advertisement data with a response or display of a contest entry to client 102. In other examples, advertisement server 108 may send the advertisement data directly to client 102 based on information from server 106 and client 102.

It will be recognized that server 106 and advertisement server 108 are illustrated as separate items for illustrative purposes only. In some examples, various features may be included in whole or in part with a common server device, server system or provider network (e.g., a common backend), or the like; conversely, individually shown devices may comprise multiple devices and be distributed over multiple locations. For example, a media server may operate to upload contest entries and cause their storage in a local or remote database 120, which is accessible by server 106, sorting logic 164 and schedule logic 166 may be included in separate devices, and so on. Further, various additional servers and devices may be included such as web servers, media servers, mail servers, mobile servers, and the like as will be appreciated by those of ordinary skill in the art.

Figure 2:
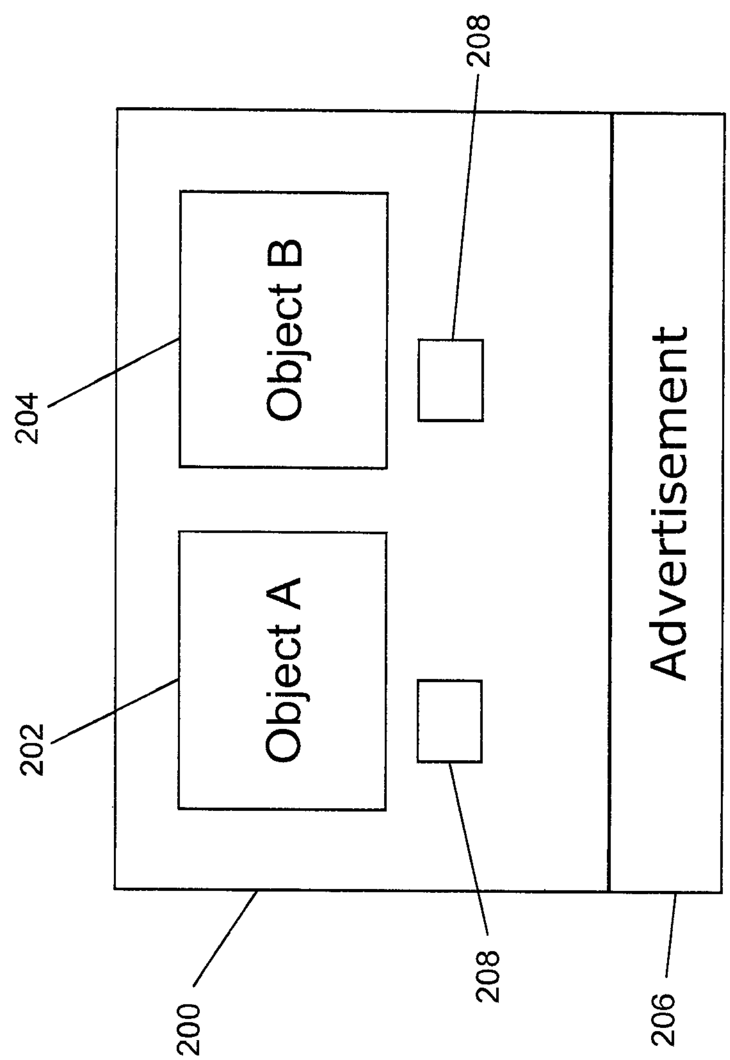
FIGS. 2-4 illustrate exemplary interfaces for displaying contest entries and selecting contest entry preferences.

FIG. 2 illustrates an exemplary user interface 200 for displaying entries and registering user selection or preferences of the contest entries. User interface 200 may be stored as an application in any computer system; for example, user interface 200 may operate on one or more computer devices, including stand alone computers, server computers connected to client computers over a network, and the like. In one particular example, user interface 200 may run as an application on a server computer or computers (see, e.g., server 106 of FIG. 1), where users may access and input selections via client computers (e.g., client computers 102) via a web browser or the like. Various other methods and systems for displaying and accessing user interface 200 are contemplated.

User interface 200 may be displayed, for example, in one or more windows on a computer screen, or in a Web browser. User interface 200 may have associated therewith computer program code in HyperText Markup Language (HTML), JavaScript®, Java®, combinations thereof, or any other form of computer-executable code, for causing the user interface elements shown in FIGS. 2-4 to be displayed to a user and to accept user interactions.

In one example, the process is initiated by a user typing into a browser the Uniform Resource Locator (URL) of the server Web site. In response to receipt of this communication from a participant's browser, software operating at the server controls the server to send the browser information associated with the user interface 200, e.g., a Hypertext Mark-up Language (HTML) document, having features and functionality as discussed herein. An interactive session may follow, whereby the user may select/rank contest entries, view contest entry rankings, and the like. Additionally, depending on the implementation, various log-in and user identification methods and interfaces may be used as will be appreciated by those of ordinary skill in the art.

In one example, user interface 200 operates to display contest entry 202 and contest entry 204, which are selectable by the user. Contest entry 202 and contest entry 204 may include an icon, hyperlink, image, or other discernable indicia associated with contest entry 202 and contest entry 204. For example, contest entry 202 and contest entry 204 may include an image associated with the contest entry, a text description of the contest entry (e.g., name), a video clip, an audio clip, or combinations thereof. In some example, a media object such as an audio or video file may be displayed in-place within interface 200; in other examples, a media object may be selectable to play in a media player or separate window. Contest entry 202 and 204 are generally selected and displayed from a set of contest entries for a particular contest. For example, contest entry 202 and 204 may be selected from a set of media objects (e.g., audio, video, image files, etc.), web sites, celebrities, movie characters, sports icons, singers, products, social issues, and the like.

A user may make a selection of one of the two contest entries for voting purpose by moving a cursor over contest entry 202 or 204 (whether an image, text, etc.) and selecting (e.g., clicking a mouse). In other examples, other methods of making a selection may be included, such as vote buttons 208, which may display a check mark when selected. In other examples, more than two contest entries may be displayed at a given time, where a user may vote on one of the displayed entries or may rank the displayed entries. For instance, interface 200 may display three or more contest entries and allow a user to rank the set in order of preference, e.g., first, second, and third.

Selections of contest entries may be stored for individual users as well as over multiple users to create both individualized user and composite defeat data and/or rankings of contest entries within the set of contest entries (e.g., within the set of movie characters, etc.). Users may access and view a ranking of contest entries based on the individual user's selection as well as selections of multiple users.

As a user makes selections of one of contest entry 202 or contest entry 204, the selection is registered or stored. The user interface 200 continues to present a new pairing of contest entries (which may include one of the original pairing of contest entries) for selection by the user after a selection of contest entries 202 or contest entries 204 has been made. The method for the scheduling of contest entry pairings is discussed in greater detail below.

The selection process by the user may be continued for a preset number of iterations, until the contest entry combinations have been exhausted, or a user chooses to cease voting. The system may have various implementations for use by users. For example, a user may view rankings and/or head-to-head match-up results without first making selections. In other examples, the system may require the user to first make a prerequisite number of contest entries selections (to ensure sufficient sampling for the ranking system, for example).

Contest entries 202 and 204 may be presented to a user in a random fashion from a set of contest entries (e.g., from a set movie characters). In other examples, however, the contest entries 202 and 204 are presented from a set of contest entries in a non-random fashion, e.g., via a scheduler or scheduler logic as described. In one example, contest entries 202 and 204 are displayed for selection based on their rankings, e.g., closely ranked contest entries, strongly/weakly ranked contest entries, and the like. Such a system may help determine and distinguish contest entries that are ranked closely by displaying contest entries together that are ranked relatively closely more often than contest entries ranked relatively distantly. For example, if a set of contest entries includes 50 contest entries, the system may match contest entries ranked $3^{rd}$ and $5^{th}$ more often than contest entries ranked $1^{st}$ and $50^{th}$. Additionally, higher ranked contest entries may be selected for pairing more often than lower ranked contest entries.

Interface 200 may further include an advertisement portion 206 for display therewith. The advertisement content may be associated with a contest entry or contest theme, and displayed on the contest entry ranking user interface 200, in its own window, as a banner, or in an associated window or interface. The advertisement may also take the form of a sponsored contest. In another example, one or more advertisements may be displayed within or associated with interface 200 in response to the selection of a contest entry. Additionally, various other page headers or footers may be displayed.

Figure 3:
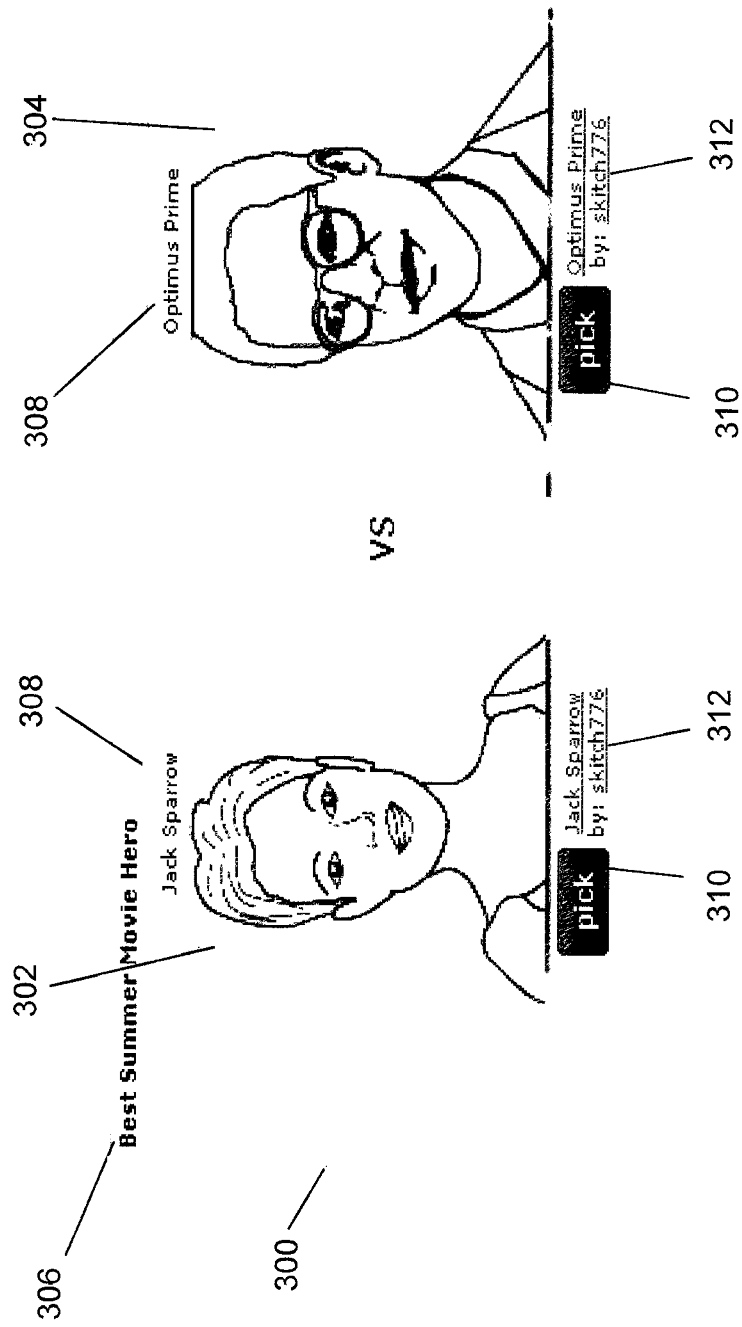

FIG. 3 illustrates another exemplary user interface 300 for selecting and registering user preferences of multiple contest entries. In this instance, user interface 300 displays a first contest entry 302 including an image associated with the contest entry, a second contest entry 304 including an image associated with the contest entry, the name of the contest 306, names of the contest entries 308, and a name 312 of the person or entity that submitted the contest entry. Additionally, each contest entry 302 and 304 includes an icon 310 for voting or selecting that particular contest entry, here labeled "pick" (as will be appreciated, in other examples, other selection buttons or actions, e.g., via input devices, are possible).

User interface 300 may be a window or embedded within a larger window of a browser application, for example. Various other information and options may be included. For example, a "draw" option may be included, whereby the user passes and does not register a preference for either contest entry and proceeds to the next pairing of contest entries. This may be interpreted by the system as equivalent, e.g., a tie between the two entries, or not at all, e.g., no vote.

Figure 4:
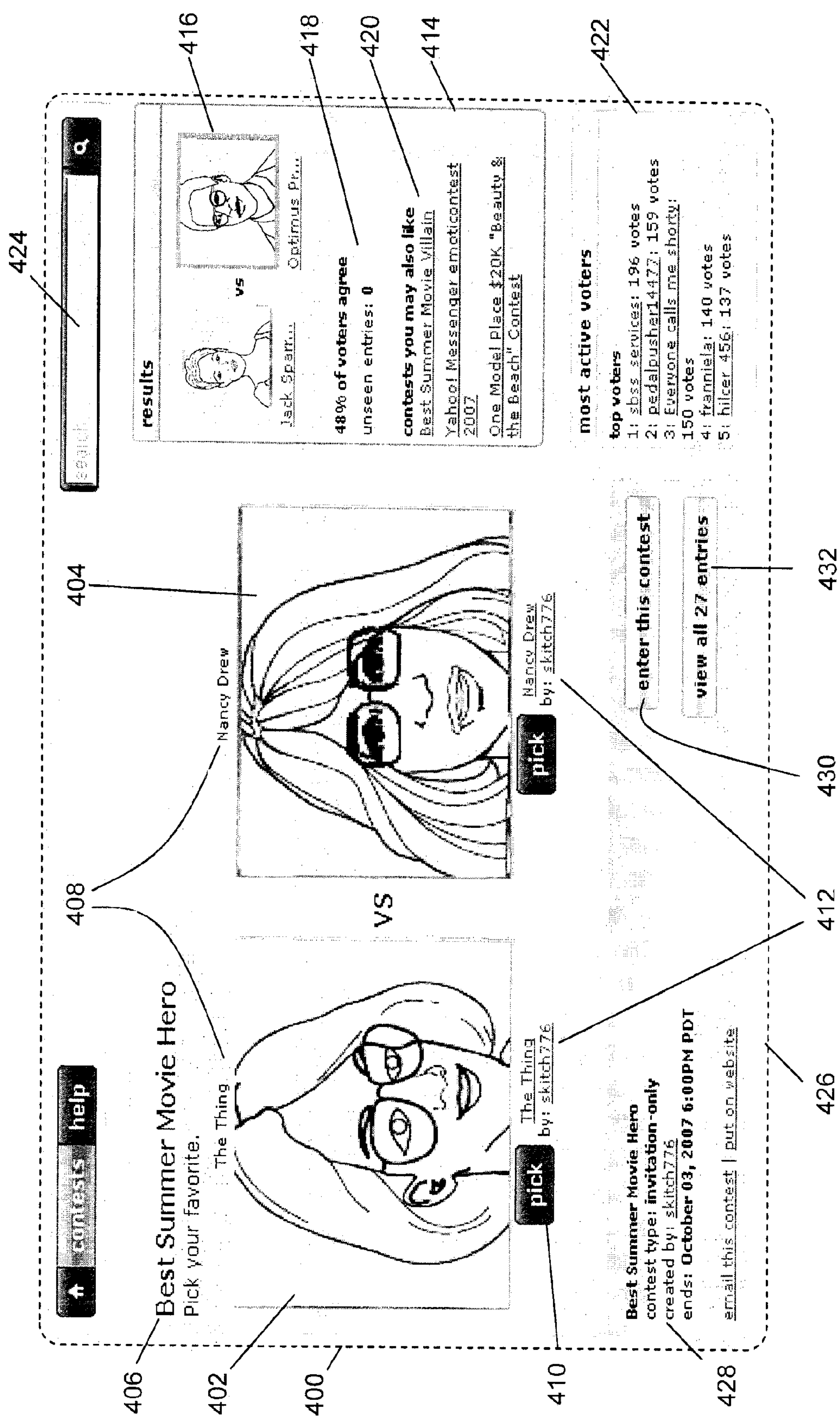

FIG. 4 illustrates another exemplary user interface 400 for selecting and registering user preferences of multiple contest entries. In this example, the interface 400 includes a first contest entry 402 including an image associated with the first contest entry, second contest entry 404 including an image associated with the second content entry, the name of the contest 406, the name of the contest entry 408, and the name of the user or entity that submitted the contest entry 412. Also, each contest entry 402 and 404 may include an icon 410 for voting or selecting that particular contest entry.

Interface 426 may display information about the current contest via a window thereof. For example, a window may include contest information 428 containing the name of the contest, contest type, contest creator, and end date. Additionally, contest entry information interface 426 may include an enter contest button 430 and a view all entries button 432, both of which selectable by the user.

In another example, and in addition to the contest entry user interface 400, a results interface 414 may be included to display information such as previous results 416 indicating the last selection, contest status information 418, e.g., indicating how other users have voted on the prior match-up and how many entries are left to be viewed, related contests 420 indicating other contests which the user may find interesting (and links thereto), and so on. Links may be provided for related contests 420. Additionally, a most active user interface 422 may be included indicating the users who have entered the most votes in a particular contest.

In another example, a search box 424 may be included to allow a user to search for contest entries or contests that have been submitting, e.g., amongst all current and past contests. Additionally, a user may search for other users, related contest entries, and so on.

In another example, a comment interface or interface element (not displayed) for user input or viewing of user comments. For example, users may leave comments about a particular contest or contest entry. In addition to the comments, the user's name, the user's icon, the date a comment was posted, or the like may be displayed.

Figure 5:
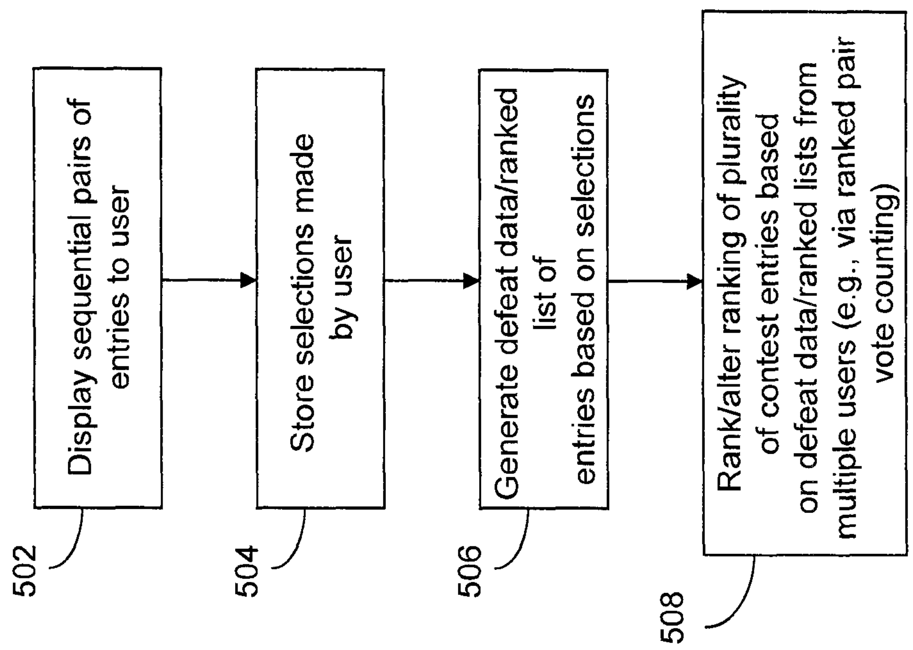
FIG. 5 illustrates an exemplary method for generating a ballot and ranking contest entries based on user selected preferences.

FIG. 5 illustrates an exemplary method for ranking a set of contest entries based on user selected preferences, and in one example, based on a preference ballot generated in response to user input, where each ballot comprises defeat data and/or a ranked list of at least a portion of the set of contest entries. Initially, a user or other party (e.g., a service provider, advertiser, etc.) may create a contest which users may enter by submitting a contest entry to server or system hosting the contest. In one example, contest entries may be submitted before and after contest voting has commenced. If multiple contests are created, the contests may be grouped together into contest categories such as videos, pictures, and the like. A user may access a particular contest, for example, within a contest list interface, a user may select a particular contest category. Additionally, the category may be further divided into individual contests such as best actor, best opera singer, and so on.

The method includes displaying sequential subsets of entries to a user at 502. For example, a user is presented with two or more contest entries of a particular contest as described. The two or more contest entries may be displayed to the user in any suitable fashion for selection by the user. Although examples generally show and describe the pairing of two contest entries for a head-to-head match-up, in other examples, a set of three or more contest entries may be displayed for selection of one of the displayed entries or for ranking the displayed entries relative to each other.

In one example, each subsequent subset of displayed entries is based on previous votes or displayed entries; for example, the method may include displaying entries that have not been viewed by the particular user or selecting particular entries based on the previous votes to generate a ranked list of entries in an economical fashion. In another example, the method includes selecting the next entries for display based on the state of the contest (and may also base the selections on the user's previous votes) as described in greater detail below.

The selections by the user are then stored at 504. The selections may be stored with a user device, a server device, or both. In other examples, the user selections are used for generating a ballot, including the ranked list which is stored, but individual selections of pair-wise mach-ups are not stored.

Defeat data and/or a ranked list of contest entries for the user is generated at 506, the defeat data or ranked list based on user selections of the sequentially displayed entries. For example, as a user makes selections (e.g., A>B, B>C, and A>D), defeat data may be generated, which may include defeat graphs (or directed acyclic graphs, such as A>B>C and A>D) associated with the user selections. Further, in an example where the user has selected sufficient contest entries, a suitable sorting algorithm such as a binary insertion sort algorithm operates on user selections to generate a ranked list of contest entries (e.g., A>B>C>D> . . . ). It will be appreciated that other methods of generating defeat data or a ranked list may be used. Further, in one example, the defeat data or ranked list of entries may be displayed to the user as it is generated based upon the user's selections.

The exemplary balloting system, which generates defeat data or a ranked list, provides more data for tallying the votes and ranking the entries. For example, data indicating preferences of A>B, C>D, and F>E does not provide as much information as data associated with a ranking of A>B>C>D>F>E. In particular, as with the latter, various inferences may be made (A>C, A>D, A>F, A>E, B>D, B>F, etc.) for the tally and final rankings. Thus, the defeat data or ranked list may be turned into a list of pair-wise defeat data, suitable for input into an exemplary Condorcet algorithm for ranking and determining a winner. It will be appreciated that the defeat data/ranked list may be used and converted in other fashions for other tallying algorithms.

The method further includes generating a contest winner or ranking of contest entries based on the received ballots at 508. In one example, ranking logic includes a Ranked Pairs algorithm used to tally received ballots (each having a ranked list of at least a portion of the contest entries). The exemplary algorithm is generally a pair-wise-comparison method that falls into a class of algorithms generally referred to as a Condorcet method. Accordingly, in one example, the defeat data or ranked list is converted into data for use by a tallying function. For example, the defeat data/ranked list is converted to a list of pair-wise defeat data for use by a Condorcet algorithm to tally the winner, where the "Condorcet winner" is defined to be the candidate whom voters prefer to each other candidate, when compared to them one at a time.

For instance, an exemplary Condorcet algorithm may include using the list of pair-wise defeat data to compare each entry to every other in a pair-wise fashion and tally a "win" for the preferred entry. The wins are summed for all received preference ballots and the winner determined by the entry having the greatest total. It will be appreciated that similar algorithms such as Ranked Pairs, Minimax, and Schulze methods may be implemented, and further that various modifications or variations to the described Condorcet method are possible.

In the event of a tie, various exemplary tie-breakers are possible, such as resorting to the provisional ranking described herein, based on time in the contest, samples in the contest, overall winning percentage in head-to-head match-ups, randomly selecting the winner (e.g., coin flip), and so on.

As the number of entries grows, the Ranked Pairs algorithm may desirably only be computed for a certain size of n (e.g., n<1,000) because the computational complexity of the algorithm grows as n^2. In one example, if the contest has too many entries (e.g., n>1,000), only the top X entries are considered, where X may be adjusted based on desired response time, available computing resources, desired confidence in the ranking, and so on. Further, as described below, the entries may be ranked prior to the tally of ranked lists based on other methods, such as winning percentage, scoring methods such as the known Elo scoring methods, or the like; accordingly, for reasonable sizes of n (e.g., n<1,000), it is unlikely that this procedure would exclude an entry that is the proper winner (e.g., the proper "Condorcet winner") according to the ballots.

In one example, tallying votes (e.g., via received preference ballots) and generating a ranking of entries is improved by having a large number of pair-wise selection data. The scheduler logic may therefore attempt to schedule display time for entries to receive maximal data from the fewest number of pair-wise comparisons. For example, if there are 1000 entries, there are 499,500 pair-wise combinations of entries. The "good" entries would receive few pair-wise comparisons with other "good" entries (relative to comparisons with poor entries) if randomly matched-up. For instance, if a system received 499,500 comparisons on randomly chosen entry pairs, on average you would have one comparison between any two entries. Such data provides little new data to indicate a particular good entry is better than something poor, or that something average is better than something else that is average. The scheduler therefore attempts to match-up highly ranked entries more frequently with other highly ranked entries to increase the reliability or confidence in the top end of the rankings and the overall winner.

In one example, the selection logic used to select the contest entries for display to the user operates in two modes. A first mode includes a sorting mode in which pairings are presented to the user to properly rank contest entries that have already been viewed by the user. The selection logic in sorting mode acts as a comparator using a binary insertion sort algorithm, which is well known to those skilled in the art. However, other algorithms such as the quicksort may easily replace the binary insertion sort algorithm. In one example, the selection logic in sorting mode selects contest entries in a non-random fashion. Contest entries are selected to properly sort closely ranked entries.

The second mode includes an exploration mode wherein unseen contest entries are introduced to the user. In one example, the selection logic in exploration mode randomly selects contest entries using assigned frequencies, as will be discussed in detail below.

The selection logic may switch back and forth between the sorting and exploration modes based upon the state of the sort. For example, if there remain unseen contest entries, and there are no partially sorted contest entries near the top of the sorted contest entries, then the system may operate in the exploration mode. If, however, there remains contest entries to be sorted that are near the top of the sorted contest entries, the system may operate in the sorting mode.

In one example, the selection logic may begin the voting process for a contest by a user by selecting contest entries that have been ranked highly by other users in order to build a sorted list. From there, the selection logic may alternate between explore and sort modes.

Figure 6:
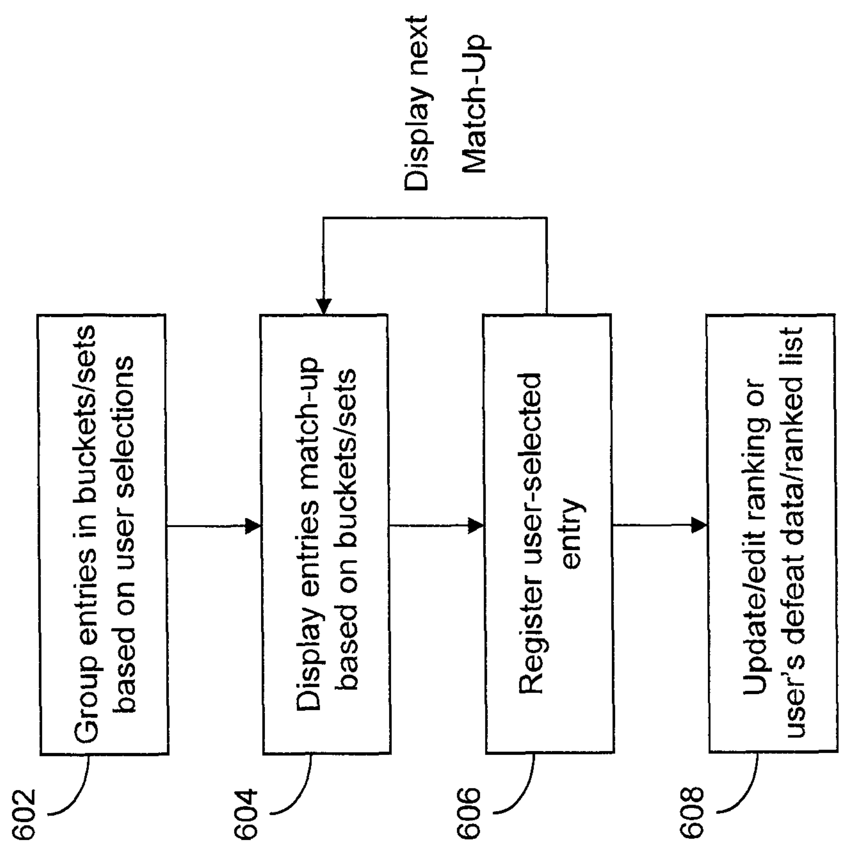
FIG. 6 illustrates an exemplary method for displaying contest entries and ranking contest entries based on user selected preferences.

FIG. 6 illustrate an exemplary method for displaying entries to a user for voting. Initially, the plurality of contest entries are scored and provisionally ranked based on previous user voting, e.g., based on winning percentage, received ranked lists, pair wise comparison, and so on. The provisional ranking of contest entries is then groped into buckets at 602.

The method includes selecting a pair-wise comparison for display to a user at 604 based on the buckets and a predefined algorithm or set of rules. For example, as described below, highly ranked entries may be displayed with greater frequency than others, entries that have received fewer votes may be displayed with greater frequency, and so on.

The method further includes storing or registering the user selected entry at 606. Further, subsequent to each selection, the method selects a new set of entries, which may be selected and displayed as indicated by the arrow from 606 to 604.

The method may further update or edit the overall provisional ranking based on the user selection(s) at 608. For example, the ranking from which the entries are grouped etc., may be updated, entries may move from one bucket to another, may exceed thresholds, and the like to influence future display selections. Further, the selections made may be used to edit or generate the user's ballot, e.g., for generating the user's ranked list.

In one example, the scheduler logic for determining how often a contest entry will be displayed to a user includes a scoring system for provisionally ranking the entries for display purposes (but not to directly determine a final ranking or winner). In one example, the scheduler periodically calculates a score for every contest entry, which may be based on user selections, user ballots, winning percentages, combinations thereof, or the like. The provisional rank may be adjusted on user input, such as selections in head-to-head match-ups, received ballots, and so on. The scheduler may then use the provisional rank to schedule or determine the frequency of display for certain entries, displayed match-ups, and so on. Further, the scheduler may use information associated with entries, such as relative votes associated therewith (e.g., number of times involved in a display), time the entry has been in the contest, etc., to schedule future displays.

In one example, the scoring system for adjusting the provisionally ranking of the entries is similar to the known Elo scoring system commonly used to rank chess players. For example, the entries are assigned a score based on their relative rankings, where the score is increased or decreased based on wins or losses. Further, the amount the score is increased or decreased may depend on the ranking of the opponent. Thus, the score acts as a provisional quality score and adjusts the provisional ranking as users make selections in individual match-ups.

Using this method, the provisional quality score (as determined by the voting) of contest entries typically follows a non-uniform distribution, e.g., a Gaussian or bell curve distribution. In one example, the scheduler takes the non-uniform distribution of contest entries and creates a histogram. The contest entries are then placed into buckets, in one example, representing a certain standard deviation range of the distribution such as +2 to +3 deviations (of course any number and size of buckets are possible, and buckets need not be uniform sizes). The scheduler may assign a target number or percentage of votes that each contest entry will be associated with (e.g., the number of times the contest entry is involved in a vote despite whether winning or losing) based on the bucket they have been placed in. For example, the following table illustrates the percentages assigned to a plurality of buckets in an exemplary system:

| | Deviations | | |
|---|---|---|---|
| | −∞ to +2 | +2 to +3 | +3 to +∞ |
| % of voter attention | 20% | 20% | 60% |

In this exemplary configuration, the contest entries that are ranked high (e.g., greater than 3 deviations above the mean) are more likely to be displayed to the user. This may result in more reliable or accurate rankings at the top while still allowing a highly ranked entry to be paired with a lower ranked entry to stabilize the overall rankings. This method and system may provide more confidence and reliability in the top ranked entries, e.g., those in the highest bucket, while perhaps providing less confidence in the rankings around the mean.

Additionally, in one example, individual contest entries may be excluded from the results or contest winnings if a particular contest entry does not receive a threshold number or percentage of votes. In another example, the scheduler will select a particular contest entry to be displayed more often if the contest entry has not received a sufficient number of votes (e.g., if the threshold has not been meet or has received fewer votes than other entries within its bucket). In another example, the scheduler may display the contest entry in sequential votes until the contest entry has received a sufficient number of votes. This allows late entries the ability to receive a sufficient number of votes to be considered in the rankings. In one example, the target number or percentage of votes is higher for the +3 deviation buckets compared to the −3 deviation buckets.

In another example, the scheduler may schedule contest entries within a particular bucket to have substantially equal number of votes. Accordingly, as a new contest entry is added to the system, or moves from one bucket to another, the scheduler may display the contest entry more (or less) often to achieve similar numbers of votes.

In one example, a ranking logic, e.g., via the Ranked Pairs method, ranks at least the top portion of the entries and determines a winner based on the received ballots. However, because a tally function such as the Ranked Pairs method may be computationally expensive, the system may rank a top portion (e.g., the top ten) of the entries using a tally function, and the remaining entries using the provisional scores calculated/used by the scheduler. The number of entries ranked using the tally functions versus the provisional scoring method may be selectable by the system.

In one example, fraud detection may be included to detect unusual voting patterns by one or more users. For example, a user wishing a particular entry to win may intentionally vote for that entry and vote against other similarly ranked entries multiple times (voting for the $2^{nd}$ rated entry and repeatedly voting against the $1^{st}$ and $3^{rd}$-$5^{th}$ ranked entries despite their respective match-ups). Such detecting may be achieved by tracking the number of votes from a particular IP address and any such unusual voting patterns. Additional votes (or all votes) from an IP address determined as such may be excluded from the rankings. Various algorithms and fraud detection methods and systems may be used.

Figure 7:
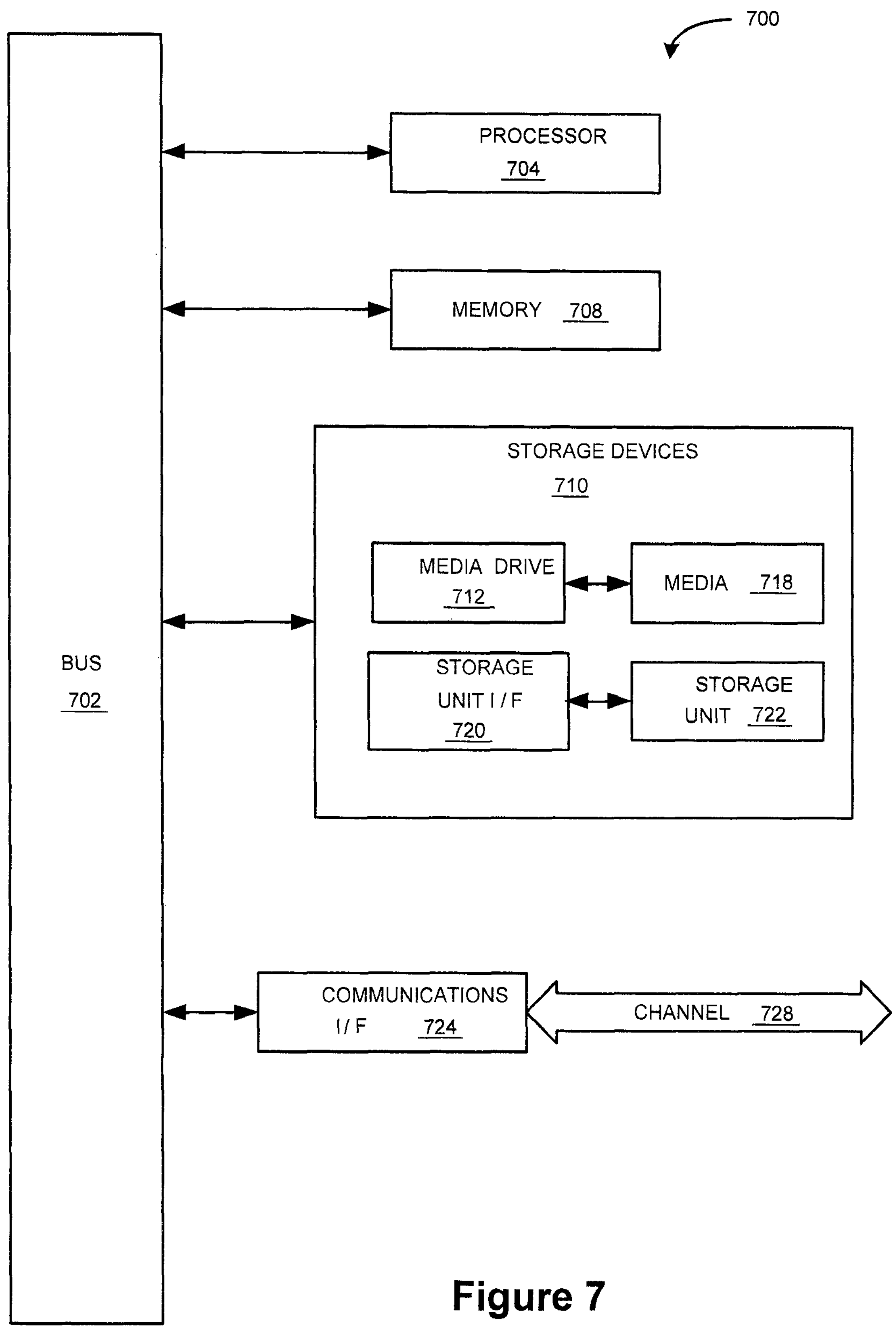
FIG. 7 illustrates an exemplary computing system that may be employed to implement processing functionality for various aspects of the invention.

FIG. 7 illustrates an exemplary computing system 700 that may be employed to implement processing functionality for various aspects of the invention (e.g., as a user/client device, server device(s), media capture server, media data store, activity data logic/database, advertisement server, combinations thereof, and the like.). Those skilled in the relevant art will also recognize how to implement the invention using other computer systems or architectures. Computing system 700 may represent, for example, a user device such as a desktop, mobile phone, personal entertainment device, DVR, and so on, a mainframe, server, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, preferably random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage mechanism 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage mechanism 710 may include other similar instrumentalities for allowing computer programs or other instructions or data to be loaded into computing system 700. Such instrumentalities may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical, or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 708, storage device 718, storage unit 722, or signal(s) on channel 728. These and other forms of computer-readable media may be involved in providing one or more sequences of one or more instructions to processor 704 for execution. Such instructions, generally referred to as "computer program code" (which may be grouped in the form of computer programs or other groupings), when executed, enable the computing system 700 to perform features or functions of embodiments of the present invention.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:

scheduling, by a computing device, one or more display times of entries of a plurality of web-based contest entries, the scheduling comprising calculating a score for every entry in the entries to determine a frequency of display for the every entry, the score based on past user selections of one or more entries in the plurality of web-based contest entries;

causing, by the computing device, display of a first subset of entries in the entries based on the calculated score for each of the first subset of entries;

receiving, by the computing device from a first user, a first selection identifying a first entry from the first subset of entries;

causing, by the computing device, display of a second subset of entries from the entries, wherein the second subset of entries are selected for display based at least in part on the first selection, at least in part on a previous ranking of one or more of the second subset of entries, and at least in part on a number of votes previously received for each of the second subset of entries;

receiving, by the computing device from the first user, a second selection identifying a second entry from the second subset of entries;

generating, by the computing device, a first preference ballot of displayed entries, the first preference ballot comprising entries from the selections by the first user; and ranking, by the computing device, at least a portion of the plurality of web-based contest entries based upon the first preference ballot and a second preference ballot associated with a second user different than the first user, the second preference ballot comprising entries from selections by the second user.

2. The method of claim 1, wherein ranking is determined from the first and second preference ballots via a Ranked Pairs vote counting algorithm.

3. The method of claim 1, wherein ranking is determined from the first and second preference ballots via a Condorcet algorithm.

4. The method of claim 1, wherein the subsets of entries each comprise at least two entries.

5. The method of claim 1, wherein the subsets of entries each comprise at least three entries.

6. The method of claim 1, wherein the preference ballot is generated by a quicksort or binary insertion sort algorithm.

7. The method of claim 1, wherein the preference ballot comprises defeat data of the displayed entries.

8. The method of claim 1, wherein the preference ballot comprises a ranked list of the displayed entries.

9. A method comprising:

scheduling, by a computing device, one or more display times of entries of a plurality of web-based contest entries, the scheduling comprising calculating a score for every entry in the entries to determine a frequency of display for the every entry, the score based on past user selections of one or more entries in the plurality of web-based contest entries;

causing, by the computing device, display of a first subset of entries in the entries based on the calculated score for each of the first subset of entries;

receiving, by the computing device from a first user, a first selection identifying a first entry from the first subset of entries;

receiving, by the computing device from the first user, a second selection identifying a second entry from a second subset of entries of the plurality of web-based contest entries, the second subset of entries selected based at least in part on the first selection, at least in part on a previous ranking of one or more of the second subset of entries, and at least in part on a number of votes previously received for each of the second subset of entries;

generating, by the computing device, a first preference ballot of at least two entries of the plurality of web-based contest entries, the first preference ballot comprised of entries from the first selection and the second selection;

generating, by the computing device, a second preference ballot of at least two entries of the plurality of web-based contest entries, the second preference ballot associated with a second user; and ranking, by the computing device, at least a portion of the plurality of web-based contest entries based on the first and second preference ballots.

10. The method of claim 9, wherein ranking is determined from the first and second preference ballots via a Condorcet algorithm.

11. The method of claim 9, wherein the first preference ballot comprises defeat data of the at least two plurality of entries.

12. The method of claim 9, wherein the first preference ballot comprises a ranked list of the at least two plurality of entries.

13. An apparatus comprising:

a processor;

a storage medium for tangibly storing thereon program logic for execution by the processor, the program logic comprising logic for:

scheduling one or more display times of entries of a plurality of web-based contest entries, the scheduling comprising calculating a score for every entry in the entries to determine a frequency of display for the every entry, the score based on past user selections of one or more entries in the plurality of web-based contest entries;

causing display of a first subset of entries in the entries based on the calculated score for each of the first subset of entries;

receiving, from a first user, a first selection identifying a first entry from the first subset of entries;

causing display of a second subset of entries from the plurality of web-based contest entries, wherein the second subset of entries are selected for display based at least in part on the first selection, at least in part on a previous ranking of one or more of the second subset of entries, and at least in part on a number of votes previously received for each of the second subset of entries;

receiving, from the first user, a second selection identifying a second entry from the second subset of entries;

generating a preference ballot of entries based on user selections; and ranking the plurality of web-based contest entries based upon multiple preference ballots.

14. The apparatus of claim 13, wherein ranking is determined via a Condorcet algorithm.

15. The apparatus of claim 13, wherein the logic is further for displaying at least the top ranked entry.

16. A non-transitory computer readable storage medium tangibly comprising program code for execution by a processor for ranking items, the computer readable storage medium comprising:

program code for scheduling one or more display times of entries of a plurality of web-based contest entries, the scheduling comprising calculating a score for every entry in the entries to determine a frequency of display for the every entry, the score based on past user selections of one or more entries in the plurality of web-based contest entries;

program code for displaying a first subset of entries in the entries based on the calculated score for each of the first subset of entries;

program code for receiving, from a first user, a first selection identifying a first entry from the first subset of entries;

program code for displaying a second subset of entries from the plurality of web-based contest entries, wherein the second subset of entries are selected for display based at least in part on the first selection, at least in part on a previous ranking of one or more of the second subset of entries, and at least in part on a number of votes previously received for each of the second subset of entries;

program code for receiving, from the first user, a second selection identifying a second entry from the second subset of entries;

program code for generating a first preference ballot of displayed entries, the first preference ballot comprising entries from the selections by the first user; and program code for ranking at least a portion of the plurality of entries based upon the first preference ballot and a second preference ballot associated with a second user different than the first user.

17. The non-transitory computer readable storage medium of claim 16, wherein the program code for ranking comprises program code for executing a Condorcet algorithm.

18. The non-transitory computer readable storage medium of claim 16, wherein the subsets of entries each comprise a pair of entries.

19. The non-transitory computer readable storage medium of claim 16, further comprising program code for displaying at least the top ranked entry.

20. The non-transitory computer readable storage medium of claim 16, wherein the first preference ballot comprises defeat data of the displayed entries.

21. The non-transitory computer readable storage medium of claim 16, wherein the first preference ballot comprises a ranked list of the displayed entries.

* * * * *